Patented May 1, 1951

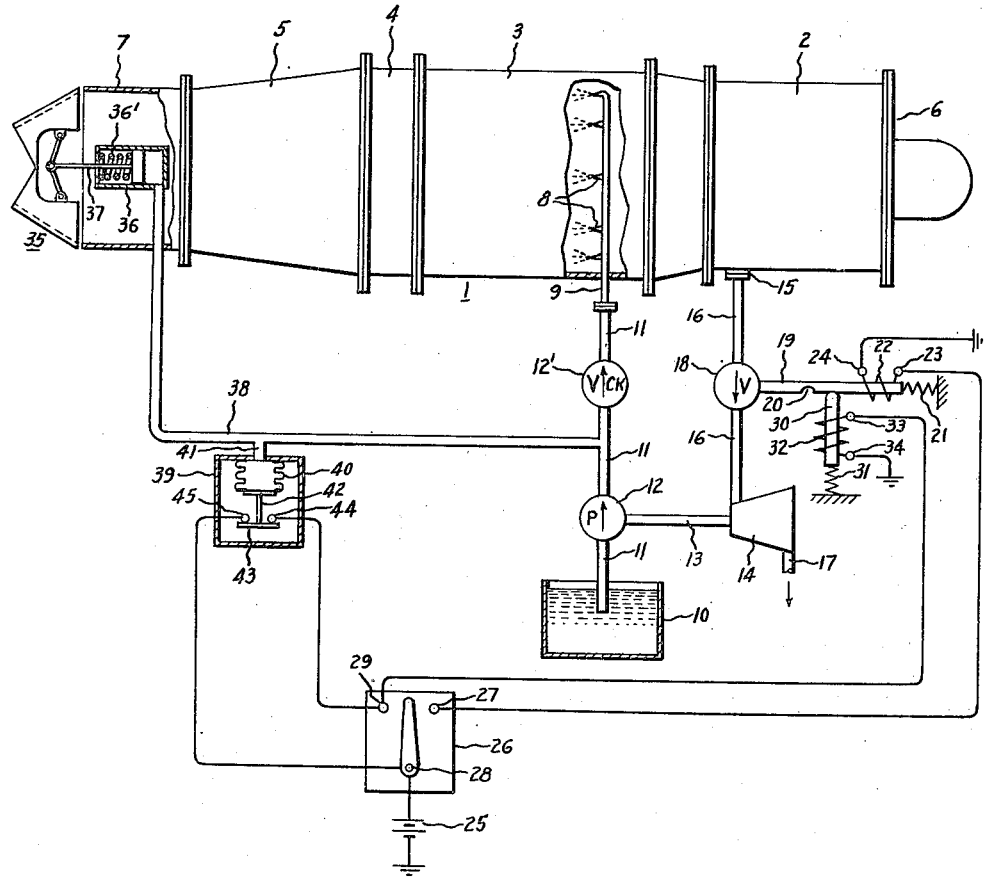

2,551,229

UNITED STATES PATENT OFFICE 2,551,229

VARIABLE AREA NOZZLE AND FLUID INJECTION CONTROL FOR TURBOJET ENGINES

Joseph S. Alford, Nahant, Neil Burgess, Melrose, and Ira G. Cruckshank, Malden, Mass., assignors to General Electric Company, a corporation of New York Application October 14, 1949, Serial No. 121,328

7 Claims. (Cl. 60—35.6)

This invention relates to gas turbine powerplants and more particularly to devices for augmenting the output of such powerplants.

Particularly in military aircraft service, gas turbine powerplants are entirely adequate for propelling an aircraft at normal flight speeds but may furnish inadequate power for take-off purposes. Furthermore, special military missions often require extra bursts of speed or power for relatively short periods of time. Accordingly, it is desirable to provide means for augmenting the output of such powerplants for relatively short periods to avoid the additional weight involved if extra powerplants were provided.

One known method of providing such augmentation is by burning supplementary fuel in the exhaust system of the powerplant as described in the copending application of Edward Woll, S. N. 80,696, filed March 10, 1949, and assigned to the assignee of the present application. Other known methods of providing augmentation include injecting water or a mixture of water and other suitable fluid at the inlet of the compressor or into the combustor system. When the fluid is injected at the compressor inlet, the cooling action of the water causes the compression process to more nearly approach isothermal compression rather than adiabatic. As a result of this more efficient compression process, a smaller percentage of the energy available at the turbine inlet is required to drive the compressor with a consequent increase in the energy available for propulsion purposes. When the injection fluid is injected into the combustor, the flow through the turbine is increased by the addition of the injection fluid. In order to pass the additional flow through the turbine nozzle an increased compressor discharge or turbine inlet pressure is required. However, the available energy at the turbine inlet resulting from this increased flow and pressure increases more rapidly than the additional energy required by the compressor, and therefore additional output of the powerplant is obtained.

In a fluid injecting system of either type, pumping means must be provided so that fluid can be injected into the powerplant. Turbine driven centrifugal-type pumping means adapted for operation at high rotational speeds are well suited for aircraft service since adequate pumping capacity can be provided with minimum physical dimensions of the pumping and the driving means therefor. This is an important feature in aircraft service where weight and bulk must be kept to a minimum. It should be understood, however, that the invention is not limited to the use of turbine driven centrifugal pumping means and that other types of pumping and driving means may be employed if desired. Automatic overspeed protection for the pumping means and its driving means is an important and desirable feature irrespective of the type of pumping and driving means employed. Such protection becomes a matter of great importance as the physical size of the movable elements of the pumping and driving means is reduced since the relatively low inertia of the movable elements of these means would permit destructive overspeeds to be attained quickly if the pumping and driving means were allowed to operate without load.

In addition when a powerplant of the type described is operated with fixed flow areas, a reduction in the operating temperature level of the turbine is experienced when water or a similar fluid is injected. Since the output of such powerplants generally increases with increasing temperature level, it is desirable to operate the powerplant at the highest temperature level which is commensurate with safety and the desired life expectancy. Therefore a reduction in temperature represents a loss in output.

Accordingly, it is an object of the invention to provide a mechanically simple, compact and effective fluid injection system for augmenting the output of gas turbine powerplants which obviates the above-mentioned difficulties.

Another object is to provide a fluid pumping means for a fluid injection system which is safe and reliable and in which weight and bulk are minimized.

Still another object is to protect the pumping means and its driving means against operation without load so as to prevent the destructive effects of overspeeding.

A further object is in the provision of a novel fluid injection system having means for operating a powerplant of the type described at the highest temperature level which is consistent with safe operation of the powerplant.

Other objects and advantages will be apparent from the following description taken in connection with the accompanying single drawing which represents a gas turbine powerplant provided with a fluid injection augmentation system in accordance with the invention.

Referring now to the drawing, a gas turbine powerplant is indicated generally at 1 having a compressor section 2, a combustor section 3, a turbine section 4, and an exhaust section 5 arranged in series flow relation to keep weight and diameter of the powerplant to a minimum. The mechanical details of such powerplants are not material to an understanding of the present invention and are described with greater particularity in United States Patent 2,432,359—Streid, and in copending applications of Alan Howard, Serial Number 506,930, filed October 20, 1943 (now Patent No. 2,479,573), and Serial Number 541,565 and filed June 22, 1944, and assigned to the assignee of the present application. Air is drawn from the atmosphere through an inlet 6 into the compressor section 2 where the air is compressed, thereby increasing its pressure and temperature. After leaving the compressor section the air flows to the combustor or combustors 3 where fuel is introduced and burned with the air to increase its temperature level still further. This air under pressure and at elevated temperature then leaves the combustors and flows through the turbine to the exhaust section from which it is exhausted to the atmosphere through an exhaust conduit 7. The turbine extracts at least sufficient energy from the air to drive the compressor, and the remaining energy is available for driving accessories and for propulsion of the aircraft.

As illustrated in the drawing, fluid injector means 8 are provided for introducing injection fluid to the combustor section 3 of the powerplant. It is desirable, although not absolutely essential, to provide a plurality of injector means in order to distribute the injection fluid evenly in the combustor flow path. If a plurality of injectors 8 are provided, they are connected to a common manifold 9 so that each injector 8 receives injection fluid at substantially the same pressure as the other injectors.

As previously indicated, the injection fluid may be water, or a mixture of water and alcohol, or other suitable fluid. The injection fluid is stored in a suitable reservoir 10 from which it is conveyed to the injector manifold by conduit 11. A pump 12 is provided in series flow relation with conduit 11 for effecting flow of the injection fluid from reservoir 10 to injector nozzles 8 at a suitable pressure. As already indicated, the air within the combustor section 3 is under pressure since it has been compressed in the compressor section 2. Therefore, the injection pressure must exceed the normal operating pressure which exists within the combustor section 3. During periods when the fluid injection system is not in operation, the operating pressure in the combustor section 3 will tend to cause a backward flow of heated air through pump 12. To prevent this backward flow, a check valve 12' is included in conduit 11 between the manifold 9 and pump 12. The operating characteristics of the check valve are selected so that it will prevent the backward flow of air from the combustor 3 through pump 12 if the combustor pressure exceeds the pump pressure, and will remain closed and prevent fluid delivered by the pump from entering the combustor section 3 until the pump delivery pressure exceeds the combustor pressure by a preselected value.

A shaft 13 is connected to the pump element (not shown) and to a turbine 14 which drives the pump. A fluid discharge connection or port 15 is provided within the compressor section from which a portion of the air flowing through the compressor can be diverted at a suitable pressure which is higher than atmospheric pressure. This diverted air is utilized to drive the turbine 14 and is conveyed thereto by a conduit 16 connected to the turbine and to the compressor discharge port 15. After passing through turbine 14, the air is discharged to the atmosphere through a suitable exhaust conduit 17. A valve 18 is provided in conduit 16 for controlling the operation of turbine 14 and pump 12. Valve 18 has a stem 19 having a detent portion 20 to be described hereinafter. In order to protect the turbine and pump against overspeed if either the pump or turbine loses its load, valve 18 is biased to closed position by a biasing spring 21 which engages the exposed end portion of stem 19. An electrical device, for example a solenoid 22, is provided for opening valve 18 against the action of biasing spring 21. Solenoid 22 is provided with electrical terminals 23, 24 so that the solenoid may be connected to a suitable source of voltage, represented diagrammatically in the drawing as a battery 25. A switch 26 is provided for controlling the operation of the electrical components of the system. As illustrated in the drawing, switch 26 is of the three position type which comprises contacts 27—29.

A rod or latch member 30 is provided for engaging the detent portion 20 of valve stem 19 when the valve is in the open position. A spring 31 biases latch member 30 to engage valve stem 19 so that once the valve has been opened it will be retained in the open position by rod 30 engaging detent 20. A second electrical device, such as a solenoid 32, is provided for moving rod 30 against the action of biasing spring 31 and out of the engagement with valve stem 19 so that the valve will be closed quickly under the action of biasing spring 21. Solenoid 32 is provided with electrical terminals 33, 34 which are connected to the source of voltage in a manner to be described hereinafter.

Solenoid terminals 24 and 34 are connected to ground potential. Terminal 23 is connected to switch contact 27 and solenoid terminal 33 is connected to switch contact 29 so that either solenoid 22 or solenoid 32 may be energized according to the position of switch 26. The remaining switch contact 28 is connected to the battery 25. As illustrated in the drawing switch 26 is of the well known three position type. That is, in one position of the switch connection is established between switch contacts 27 and 28, and in another position connection is established between contacts 28 and 29, and in a third or off position connection is interrupted between contacts 27—29.

As previously indicated, when water or other similar fluid is injected into a powerplant of the type described, a decrease in the operating temperature level of the powerplant results. Since this temperature reduction represents a loss in output of the powerplant, it is desirable to provide means for increasing the operating temperature level during periods when fluid is to be injected into the powerplant. This is accomplished in accordance with the invention by the provision of a variable nozzle 35 connected to exhaust conduit 7. Variable nozzle 35 may be of any convenient known type such as those described in United States Patent No. 2,481,330—Stanford Neal and in a copending application of Joseph S. Alford, Serial Number 121,326, filed October 14, 1949. A feature of the invention lies in the fact that the system is capable of satisfactory operation with a two-position type of nozzle. That is, the flow area of the nozzle in one position is preselected to match operating flow requirement of the powerplant with no augmentation. The other operating position of the nozzle furnishes a preselected flow area which matches the operating characteristics of the powerplant in accordance with the rate at which fluid is injected thereto. The flow area of the variable nozzle is varied by a fluid motor or actuator 36 connected to the nozzle segments by a rod 37. According to the invention, the powerplant injection fluid is utilized as motive fluid for operating actuator 36. Connection is established between the conduit 11 and actuator 36 by a branch conduit 38 which is connected to conduit 11 at a location between the pump and the powerplant. A spring 36' is provided for biasing nozzle 35 to the position wherein the nozzle flow area matches the flow requirement of the powerplant during operation without augmentation.

Since the rotating elements of pump 12 and turbine 14 are usually relatively small and therefore have little inertia, it is important from a safety standpoint that the pump and turbine be projected against overspeed when the supply of fluid in reservoir 10 becomes exhausted or upon mechanical failure of components. To this end, a pressure switch 39 is provided in series with solenoid 32 and is arranged to cause valve 18 to close quickly if the fluid pressure delivered by pump 12 falls below the predetermined value. Switch 39 comprises a pressure sensitive bellows 40 connected to branch conduit 38 by another branch conduit 41. A rod 42 is suitably secured to bellows 40 and carries at one end a conductor 43 which engages contacts 44, 45. Conductor 43 is biased to engage contacts 44, 45 when there is no pressure acting upon bellows 40. Bellows 40 may comprise the biasing means, or, if desired, suitable spring biasing means (not shown) may be provided. Connection is established between switch contact 29 and contact 44 and between switch contact 28 and contact 45 to complete the electrical circuit for controlling the operation of solenoids 22, 32.

When it is desired to operate the powerplant with augmented output, the operator manipulates switch 26 to establish connection between contacts 27 and 28 which energizes solenoid 22 and thus causes valve 18 to open against the action of biasing spring 21. Fluid under pressure is thereby permitted to flow through conduit 16 for driving turbine 14 which in turn drives pump 12. As previously indicated, check valve 12' is initially closed since the pressure developed by the pump has had insufficient time to build up. The pump discharge pressure will therefore build up rapidly, finally causing check valve 12' to open and causing bellows 40 to move conductor 43 out of engagement with contacts 44, 45. When the connection between contacts 44 and 45 is interrupted, solenoid 32 is disconnected from the battery 25 and the action of biasing spring 31 causes rod 30 to engage detent 20 and thus hold valve 18 in its open position. If desired, indicating means such as a light may be provided to indicate that connection between contacts 44, 45 is interrupted. At this point the operator returns switch 26 to the position shown in the drawing so as to interrupt communication between contacts 27—29. If desired, switch 26 may be provided with biasing means (not shown) which will automatically return switch 29 to the latter position when it is released by the operator.

As the pressure of the fluid delivered by pump 12 builds up to its operating value, the change in fluid pressure is communicated to actuator 36 by conduit 38 so that the variable nozzle 35 is automatically caused to move to a new position and thus the flow area of the nozzle is automatically adjusted to the proper value corresponding to operation of the powerplant with fluid injection.

If augmentation of the powerplant output is required for a relatively short period of time, for example during take-off only, the operator shuts off the water injection system by manipulating switch 26 to establish connection between switch contacts 28 and 29. This energizes solenoid 32 and thereby causes rod 30 to be moved away from valve stem 19 and out of engagement with detent 20 thus causing valve 18 to close under the action of biasing spring 21. In addition to manual control by the operator, the turbine and pump are automatically shut down if the fluid pressure delivered by the pump falls below a preselected value for any reason. A reduction in fluid pressure allows bellows 40 to collapse, thus allowing conductor 43 to re-establish connection between the pressure switch contacts 44, 45. When contacts 44, 45 are connected by conductor 43, solenoid 32 is connected to battery 25 and the solenoid will cause rod 30 to move out of engagement with detent 20 thereby automatically causing valve 18 to close and thus protect pump 12 and turbine 14 without any action by the operator.

Thus it will been seen that the invention provides a compact, safe and reliable fluid injection system for gas turbines which provides automatic temperature control of the powerplant and overspeed protection for components of the injection system. Various changes and modifications will suggest themselves to those skilled in the art. For example, as previously indicated, the injector nozzles 8 can be arranged to inject fluid at the inlet 6 to the powerplant, and it will also be appreciated that various types of variable nozzles can be employed, and area control can be effected at the inlet to the turbine instead of at the exhaust.

While a particular embodiment of the invention has been illustrated and described, it will be obvious that various changes and modifications may be made without departing from the invention, and it is intended to cover in the appending claims all such changes and modifications that come within the true spirit and scope of the invention.

What we claim as new and desire to secure by Letters Patent of the United States is:

1. In a gas turbine powerplant having a branch discharge port within the compressor section thereof and having a turbine section, thrust augmenting means comprising a fluid reservoir, injector means for injecting fluid into the powerplant, conduit means connecting said reservoir to said injector means, said conduit means including therein fluid pumping means, fluid motor means connected to said pumping means in driving relation, second conduit means connecting said motor means to said discharge port, means including a valve for controlling said motor means included in said second conduit means, a variable nozzle connected to said turbine section, actuator means connected to said nozzle and operative to effect area changes of said nozzle in response to changes in fluid pressure, and third conduit means connecting said actuator means to said first conduit means.

2. In a gas turbine powerplant having a branch port within the compressor section thereof and having a turbine section, thrust augmenting means comprising a fluid reservoir, means for injecting fluid into the powerplant, conduit means connecting said reservoir to said injecting means, said conduit means including therein fluid pumping means, fluid motor connected to said pumping means in driving relation, means including a valve for controlling said motor means, second conduit means connecting said discharge port to said valve, third conduit means connecting said valve to said motor means, a variable nozzle connected in series flow relation with said turbine section, actuator means connected to said nozzle and operative to effect area changes of said nozzle in response to changes in fluid pressure, and fourth conduit means connecting said actuator means to said first conduit means.

3. In a gas turbine powerplant having a compressor section, a combustor section, a branch fluid connection within said compressor section; and an exhaust section; fluid injection thrust augmenting means comprising a fluid reservoir; fluid injector means for injecting fluid into the combustor section of the powerplant; conduit means connecting said injector means to said reservoir; pumping means being included in said conduit means; a turbine connected to said pumping means in driving relation; means including valve means for controlling said turbine; second conduit means connecting said valve means to said fluid connection; third conduit means connecting said turbine to said valve means; a variable nozzle connected to said exhaust section; said nozzle having two operating positions corresponding to large and small flow areas; actuator means connected to said nozzle for effecting area changes thereof and operative in response to changes in pressure of the fluid discharged by said pumping means; and fourth conduit means connecting said actuator means to said first conduit means at a location between the powerplant and said pumping means; whereby said actuator causes said nozzle to move to the position corresponding to the small flow area when the pump delivery pressure exceeds a preselected value and positions said nozzle to the large flow area position when the pump delivery pressure is less than said preselected value.

4. In a fluid injection system for augmenting the output of a gas turbine powerplant having a branch discharge port within the compressor section of the powerplant; flow control means comprising fluid pumping means; a turbine drivingly connected to said pumping means; means including a valve for controlling the flow of motive fluid to said turbine; conduit means connecting said discharge port, said valve, and said turbine, respectively, in series flow relation; means biasing said valve to closed position for preventing flow of motive fluid to said turbine; means for opening said valve; latch means engaging said valve in the open position thereof for holding said valve means in an open position against the action of said biasing means; and presssure responsive means connected to said latch means and operable to release said latch means from engagement with said valve when the delivery pressure of said pumping means is less than a preselected value.

5. In a fluid injection system of gas turbine powerplant having a branch discharge port within the compressor section of the powerplant, fluid pumping means, first conduit means connecting said pumping means to the powerplant, a turbine connected to said pumping means in driving relation, second conduit means connecting said turbine to said discharge port, means including a valve for controlling said turbine included in said second conduit means, and pressure responsive means connected to said control means and to said first conduit means and operable to close said valve when the pump delivery pressure is less than a preselected value.

6. In a fluid injection system for augmenting the output of a gas turbine powerplant having a branch fluid connection within the compressor section of the powerplant, fluid pumping means; first conduit means connected to the powerplant, a turbine connected to said pumping means in driving relation, second conduit means connecting said turbine to said fluid connection, said second conduit including valve means for controlling said turbine, means biasing said valve means to closed position for preventing flow through said second conduit means, means for opening said valve means, latch means engaging said valve means in the open position therefor for holding said valve means in an open position; means biasing said latch means toward the engaged position; electrical means for disengaging said latch means against the action of said latch biasing means; connections for applying a voltage; pressure responsive switching means connected between said connections and said electrical means and said first conduit means and operable to energize said electrical means when said pump delivery pressure is less than a preselected value.

7. In a gas turbine powerplant having a combustor section and a branch fluid discharge port within the compressor section of the powerplant, a fluid injection augmentation system comprising a fluid reservoir, fluid injector means for injecting fluid into said combustor section, fluid pumping means, conduit means connecting said pumping means and said injector means respectively in series flow relation to said reservoir, an air turbine drivingly connected to said pumping means, means including a valve for controlling the flow of compressor air to said turbine, second conduit means connecting said port and said valve and said turbine respectively in series flow relation, means biasing said valve to a position for preventing the flow of compressor air through said second conduit means, means for opening said valve, latch means for engaging and retaining said valve in the open position thereof, means biasing said latch means toward the engaged position, electrically actuated means connected to said latch means, said electrical means being operable when energized to move said latch means away from the engaged position against the action of said latch biasing means, terminals for applying a voltage, pressure responsive switching means connected to said terminals and to said electrical means and operable to energize said electrical means when the pump delivery pressure is less than a preselected value, adjustable flow regulating means connected in series flow relation with the turbine section of the powerplant and having a flow area in a first position and another flow area in a second position, means biasing said regulating means to one of said positions, fluid motor means connected to said regulating means, and third conduit means connecting said fluid motor means and said switching means to said first conduit means at a location between said pumping means and said injector means, said motor means being operable to cause said regulating means to move to the other position when the pump delivery pressure exceeds said preselected value.

JOSEPH S. ALFORD.
NEIL BURGESS.
IRA G. CRUCKSHANK.

No references cited.